even Patent [19]

Karkoski et al.

[11] 4,131,714
[45] Dec. 26, 1978

[54] MIXTURES OF LINEAR POLYESTERS USED TO COAT METALLIC STRANDS

[75] Inventors: Joseph Karkoski; Lionel J. Payette; John D. Shurboff, all of Fort Wayne, Ind.

[73] Assignee: Essex International, Inc., Fort Wayne, Ind.

[21] Appl. No.: 643,568

[22] Filed: Dec. 22, 1975

[51] Int. Cl.² .................... B32B 15/02; B32B 15/08; B32B 15/20; C08L 67/00; H01B 3/42
[52] U.S. Cl. .......................... 428/379; 174/110 SR; 174/110 PM; 260/860
[58] Field of Search ............... 174/110 SR, 110 PM; 428/379; 260/860

[56] References Cited

U.S. PATENT DOCUMENTS

| 3,296,335 | 1/1967 | Blaschke | 428/379 |
|---|---|---|---|
| 3,532,666 | 10/1970 | Csaszar | 428/379 |
| 3,657,008 | 4/1972 | Gleim | 428/383 |
| 3,779,808 | 12/1973 | Cottis et al. | 428/379 |
| 3,893,642 | 7/1975 | VanVlaenderen | 174/110 SR |
| 3,953,394 | 4/1976 | Fox et al. | 260/860 |

Primary Examiner—James C. Cannon
Attorney, Agent, or Firm—Steven F. Stone

[57] ABSTRACT

Bonding compositions are disclosed as well as bondable articles utilizing such compositions. Such bonding compositions contain a crystalline polyester material and an amorphous polyester material and exhibit thermally stable bonding properties. Such bondable articles include bondable magnet wires comprising a conductor, an insulating base coat thereon and a bonding composition coated thereover containing a crystalline polyester material and an amorphous polyester material with the wires adapted to be shaped as coils and the like and thereafter bonded together with a bond which exhibits bond strength at elevated temperatures.

8 Claims, No Drawings

MIXTURES OF LINEAR POLYESTERS USED TO COAT METALLIC STRANDS

BACKGROUND OF THE INVENTION

This invention relates to bonding compositions and bondable articles utilizing such compositions. More particularly, this invention relates to a bonding composition containing a crystalline polyester material and an amorphous polyester material and a bondable magnet wire having coated thereon such a bonding composition.

A variety of applications exist for bonding compositions. One such application has been the bonding of insulated or magnet wire conductors in various uses. Among such uses are transformers, lift magnets, solenoids, bobbinless coils, clutch coils, television yoke coils and field coils for stationary and rotating windings. In recent years there has been disclosed various thermoplastic compositions for coating the insulated wire during manufacture and thereafter at the time of fabrication into the desired configuration, such as that of a coil, bonding the coated wires by such means as heating or use of a solvent or a combination of both. In the field of magnet wire, an insulated wire conductor with an additional coating of thermoplastic bonding composition is commonly referred to as a self-bonding or bondable magnet wire.

There is a definite requirement in applications, such as motor applications, for a more thermally stable bonding material, that is, a material that bonds at a relatively low temperature, exhibits good bond strength at normal or room temperature and retains bond strength at relatively elevated temperatures. As can be appreciated, a bonding composition which can be bonded at relatively low temperatures (below about 180° C.) and still retain an appreciable bond strength at temperatures as high as 200° C. or higher would represent an advancement in or a contribution to this art. Such would be particularly advantageous if the mechanical, electrical and thermal properties of the magnet wire were maintained.

SUMMARY OF THE INVENTION

The present invention contemplates a bonding composition which can be applied as a coating to a magnet wire in a conventional manner. Thereafter by economical and simple means such wires can be bonded or adhered together to form resulting articles of various shapes and dimensions with the bond exhibiting bond strength at elevated temperatures.

In accordance with one aspect of the invention a bonding composition comprising a crystalline polyester material and an amorphous polyester material is provided which exhibits thermally stable bonding properties, all of which will be more fully discussed hereinafter.

In accordance with another aspect of the invention a bonding composition comprising a crystalline polyester material and an amorphous polyester material is provided as a bondable coating on magnet wires which can be shaped as coils and the like and thereafter bonded together with a bond which exhibits bond strength at elevated temperatures, all of which will be more fully discussed hereinafter.

DESCRIPTION OF TYPICAL OR PREFERRED EMBODIMENTS

What is set forth herein is intended primarily as exemplary to enable those skilled in the art to practice the present invention and it should therefore be understood that, within the scope of the appended claims and their permissible equivalents, the invention may be practiced in other ways than as specifically described.

The crystalline and amorphous polyester materials useful in the present invention include linear thermoplastic polymers derived from glycols and organic dicarboxylic acids. Generally, the useful dicarboxylic acids are aromatic dicarboxylic acids or a mixture of an aromatic dicarboxylic acid with an aliphatic dicarboxylic acid. Representative examples of organic dicarboxylic acids include terephthalic acid, isophthalic acid, the naphthalic dicarboxylic acids, such as 1,5; 2,6; and 2,7-naphthalene dicarboxylic acids, and aliphatic dicarboxylic acids, such as adipic acid, azelaic and sebacic acid. Representative examples of glycols include the polymethylene glycols containing from 2 to 10 methylene groups in the chain, such as ethylene glycol, propylene glycol, butylene glycol, hexamethylene glycol, decamethylene glycol; branched chain glycols such as 2,2-dimethyl propane diol-1,3, 2-ethyl, 2-methyl propane diol-1,3; glycols containing a cycloaliphatic ring, such as cyclohexane dimethanol; and glycols which contain an aromatic ring, such as 2,2-bis[4(betahydroxy ethoxy) phenyl] propane.

The polyesters are prepared according to known methods. They can be prepared by reacting the glycol with a bis ester, such as bis lower alcohol ester of the acid to form the bis glycol ester of the acid or a lower polymer thereof, and then condensing this product with the elimination of glycol to form the high molecular weight polyesters. The polyesters can also be prepared by the reaction of the glycols with the free acids to form the bis glycol esters which can be condensed to high molecular weight polyesters. Usually an ester interchange catalyst, such as zinc acetate and manganese acetate, is used. Condensation catalysts, such as lead compounds and antimony compounds, are used to promote the condensation reactions.

Typical crystalline and amorphous polyester materials which can be used in the present invention include such high molecular weight materials which can form eutectic blends which can be characterized as discrete crystalline structures(spherulites or spherulite-like) of crystalline and amorphous polyester materials. Such materials will usually have a relatively high glass transition temperature of greater than about 23° C., and between 40° C. and 110° C., and preferably from about 65° C. to 95° C. "Glass transition temperature" is used herein to mean the temperature at which the solid polymer changes from a glass-like state to a rubber-like state. It may also be called the "second order transition temperature." It may be determined by procedures well known in this art. Amorphous polyester materials are those which do not typically exhibit a crystalline melting point using a differential scanning calorimeter instrument in accordance with the well-known technique for such.

Crystalline polyester materials which are preferred include those characterized as having terephthalic acid units to isophthalic acid units in a molar ratio greater than 80:20 and preferably about 90:10, and an intrinsic viscosity of from about 0.4 to 0.8 and preferably about 0.62.

Amorphous polyester materials which are preferred include those terephthalic acid based materials characterized as having neopentyl glycol units to ethylene glycol units in a molar ratio greater than 10:90 and preferably from about 30:70 to about 50:50, and an intrinsic viscosity of from about 0.50 to 0.80 and preferably about 0.65.

Amounts of crystalline polyester materials and amorphous polyester useful in the present invention can vary depending upon, inter alia, the particular composition of each material, the thickness of the coating, the desired properties and the like. Such amounts are usually from about 70:30 to about 20:80 on an amorphous polyester material to crystalline polyester material weight ratio basis with from about 40:60 to 60:40 being preferred.

The bonding compositions of the present invention exhibit typical bonding temperatures for thermoplastic material, good bond strength at normal or room temperatures, and retain some bond strength at elevated temperatures at which conventional thermoplastic bonding compositions would exhibit plastic flow. The crystallinity of the eutectic blend of the bonding composition enables it to function at elevated temperatures in much the same manner as thermosetting materials.

The mixture of crystalline polyester material and amorphous material can be applied to various substrates by brushing, roller coating and the like.

The magnet wire conductor, typically copper or aluminum and round, can have a coat of insulating material of many and various conventional enamels, coatings or insulations and a coat of a bonding composition of this invention thereover. In the coating of magnet wire, the composition can be applied in any conventional manner such as the use of dies in a wire coating tower with normal bank temperatures. The coating can be applied in various thicknesses depending upon, inter alia, the particular compositions used, the type and size of magnet wire and the physical properties desired (which are governed by industry standards). The resulting bondable magnet wire can be wound, spooled or handled in accordance with conventional magnet wire procedures.

The bondable magnet wires can be formed into a desired shape, as previously mentioned, and bonded with adjacent turns of the coated article by heating the coated article above the glass transition temperature of the bonding composition, preferably about 150° C. to about 200° C., to provide an integral bonded structure with the magnet wire turns adhering together.

In order to illustrate the present invention, the following examples are presented with parts and percentages being by weight unless otherwise specified. Additionally, the crystalline polyester material and the amorphous polyester material used in the examples can be characterized as follows:

Crystalline polyester — M.P. — 243° C. and intrinsic viscosity 0.62 (sold by Goodyear Tire & Rubber Co. as BX-915-1392). For use in some of the examples, 1200 grams were dissolved in 2800 grams of cresylic acid at a temperature of about 100° C. to about 120° C.

Amorphous polyester — glass transition temperature 70° C. and intrinsic viscosity of 0.65 (sold by Goodyear Tire & Rubber Co. as FPE — 4670A). For use in some of the examples, 600 grams were dissolved in 1400 grams of cresylic acid at a temperature of about 100° C. to 120° C.

EXAMPLE 1

To a three-neck flask equipped with a condenser, stirring rod, thermometer and gas inlet were added 300 grams of crystalline polyester — cresylic acid and 700 grams of amorphous polyester — cresylic acid. The mixture was heated to 30° C. Next the enamel was diluted with 200 grams of cresylic acid to give a 24.9% solids content and 5100 cps at 30° C.

The polyester composition was applied on wire as an overcoat on 21 AWG copper wire. The wire was bonded at 180° C. for 1 hour. The retention of bond strength at elevated temperatures is shown in the accompanying table — Table I.

EXAMPLE 2

Using the equipment described in Example 1, 2310 grams of cresylic acid, 414 grams of amorphous polyester and 276 grams of crystalline polyester were added to the flask and heated to 100° C.–120° C.

The polyester composition was applied on wire as an overcoat on 21 AWG copper wire. The wire was bonded at 180° C. for 1 hour. The retention of bond strength at elevated temperatures is shown in the accompanying table — Table I.

EXAMPLE 3

Using the equipment described in Example 1, 450 grams of crystalline polyester — cresylic acid and 550 grams of amorphous polyester — cresylic acid were added to the flask and mixed at 30° C. for 1 hour. The enamel was then diluted with 200 grams of cresylic acid. The bondcoat enamel was 25.3% solids and 5700 cps at 30° C.

The polyester composition was applied on wire as an overcoat on 21 AWG copper wire. The wire was bonded at 180° C. for 1 hour. The retention of bond strength at elevated temperatures is shown in the accompanying table — Table I.

EXAMPLE 4

Using the equipment described in Example 1, 750 grams of cresylic acid, 125 grams of amorphous polyester and 125 grams of crystalline polyester were added to the flask and heated to 100° C.–120° C.

The polyester composition was applied on wire as an overcoat on 21 AWG copper wire. The wire was bonded at 190° C. for ½ hour. The retention of bond strength at elevated temperatures is shown in the accompanying table — Table I.

EXAMPLE 5

Using the equipment described in Example 1, 550 grams of crystalline polyester — cresylic acid and 450 grams of amorphous polyester — cresylic acid were added to a flask and mixed at 30° C. for 1 hour. The enamel was then diluted with 200 grams of cresylic acid. The bondcoat enamel was 25.0% solids and 4600 cps at 30° C.

The polyester composition was applied on wire as an overcoat on 21 AWG copper wire. The wire was bonded at 180° C. for 1 hour. The retention of bond strength at elevated temperatures is shown in the accompanying table — Table I.

EXAMPLE 6

Using the equipment described in Example 1, 750 grams of cresylic acid, 100 grams of amorphous polyester and 150 grams of crystalline polyester were added to a flask and heated to 100° C.–120° C.

The polyester composition was applied on wire as an overcoat on 21 AWG copper wire. The wire was bonded at 190° C. for ½ hour. The retention of bond strength at elevated temperatures is shown in the accompanying table — Table I.

EXAMPLE 7

Using the equipment described in Example 1, 750 grams of cresylic acid, 75 grams of amorphous polyester and 175 grams of crystalline polyester were added to a flask and heated to 100° C.–120° C.

The polyester composition was applied on wire as an overcoat on 21 AWG copper wire. The wire was bonded at 190° C. for ½ hour. The retention of bond strength at elevated temperatures is shown in the accompanying table — Table I.

EXAMPLE 8

Using the equipment described in Example 1, 800 grams of crystalline polyester — cresylic acid and 200 grams of amorphous polyester — cresylic acid were added to a flask and mixed at 30° C. for 1 hour. The enamel was then diluted with 200 grams of cresylic acid. The bondcoat enamel was 25.2% solids and 5600 cps at 30° C.

The polyester composition was applied on wire as an overcoat on 21 AWG copper wire. The wire was bonded at 180° C. for 1 hour. The retention of bond strength at elevated temperatures is shown in the accompanying table — Table I.

EXAMPLE 9

Using equipment described in Example 1, 2310 grams of cresylic acid, 345 grams of amorphous polyester and 345 grams of crystalline polyester were added to a flask and heated to 100° C.–120° C.

The polyester composition was applied on wire as an overcoat on 18 AWG copper wire. The wire was bonded at 150° C. for ½ hour and had 29.3 lbs. of bond strength at room temperature. At 175° C., the bondcoat retained 4.6 lbs. of bond strength, and at 200° C. it was still 2.68 lbs.

EXAMPLE 10

The polyester composition, prepared in Example 2, was also applied on wire as an overcoat on 18 AWG copper wire. The wire was bonded at 150° C. for ½ hour and had 31.5 lbs. of bond strength at room temperature. At 175° C., the bond coat retained 3.85 lbs. of bond strength and at 200° C. it was 1.9 lbs.

The results shown in the above table clearly demonstrate the advantageous aspects of the present invention. The bond strength achieved at room temperature continued to be retained to some degree at temperatures as high as 200° C. Conventional thermoplastic bonded magnet wires could not achieve any bond strength at such temperatures due to the plastic flow of the compositions.

From the foregoing, it can be appreciated that the bonding composition and bondable magnet wire of the present invention offer many and various advantages, such as, low thermal bonding characteristics normally associated with thermoplastic materials, high bond strength at normal or room temperature, good retention of bond strength at normal or room temperature, good retention of bond strength at elevated temperatures at which normally only selected thermoset materials would exhibit bond strength, and ease of fabricating coils and the like.

Having thus described typical or preferred embodiments of the invention, we claim:

1. A bondable magnet wire comprising a magnet wire having coated thereon a bonding composition exhibiting thermally stable bonding properties said bonding composition comprising a mixture of a relatively high molecular weight linear crystalline polyester material and a relatively high molecular weight linear amorphous polyester material.

2. The bondable magnet wire of claim 1 wherein said combination is a eutectic blend with discrete crystalline structures of said crystalline polyester material and said amorphous polyester material.

3. The bondable magnet wire of claim 2 wherein said crystalline polyester material has a glass transition temperature of from about 65° C. to about 95° C. and an intrinsic viscosity of from about 0.4 to about 0.8.

4. The bondable magnet wire according to claim 3 wherein said crystalline polyester material contains terephthalic acid units to isophthalic acid units in a molar ratio greater than 80:20.

5. The bondable magnet wire according to claim 2 wherein said amorphous polyester material has a glass transition temperature of from about 65° C. to about 95° C. and an intrinsic viscosity of from about 0.50 to about 0.80.

6. The bondable magnet wire according to claim 5 wherein said amorphous polyester material contains neopentyl glycol units to ethylene glycol units in a molar ratio from about 30:70 to about 50:50.

7. The bondable magnet wire according to claim 4 wherein said amorphous polyester material has a glass transition temperature of from about 65° C. to about 95° C., contains neopentyl glycol units to ethylene glycol units in a molar ratio of from about 30:70 to about 50:50, and an intrinsic viscosity of from about 0.50 to about 0.80.

8. The bondable magnet wire according to claim 7 wherein said amorphous polyester material to said crystalline polyester material is from about 70:30 to about 20:80 on a weight ratio basis.

TABLE I

| | BOND RETENTION* (LBS.) VERSUS TEMPERATURE (° C) | | | | | | | |
|---|---|---|---|---|---|---|---|---|
| | Example 1 | Example 2 | Example 3 | Example 4 | Example 5 | Example 6 | Example 7 | Example 8 |
| Room Temperature | 17.40 | 18.40 | 15.70 | 18.60 | 16.80 | 16.60 | 16.50 | 8.16 |
| Test Temperature: | | | | | | | | |
| 175° C | 1.97 | 3.00 | 2.85 | 2.79 | 2.98 | 2.56 | 2.91 | 2.75 |
| 200° C | 1.00 | 2.30 | 1.46 | 1.51 | 1.36 | 1.62 | 1.77 | 1.69 |

*Bond retention test in accordance with NEMA Standard Publication No. MW-1000-1973, Section 57, Bond